(12) United States Patent
Spangler et al.

(10) Patent No.: US 8,185,762 B1
(45) Date of Patent: May 22, 2012

(54) LOW POWER DISPLAY

(75) Inventors: Aaron Spangler, Lake Stevens, WA (US); Matthew Wilson, Seattle, WA (US)

(73) Assignee: Google Inc., Mountain View, CA (US)

( * ) Notice: Subject to any disclaimer, the term of this patent is extended or adjusted under 35 U.S.C. 154(b) by 997 days.

(21) Appl. No.: 12/128,592

(22) Filed: May 28, 2008

(51) Int. Cl.
*G06F 1/32* (2006.01)

(52) U.S. Cl. .................. 713/323; 713/300; 713/320

(58) Field of Classification Search .......... None
See application file for complete search history.

(56) References Cited

U.S. PATENT DOCUMENTS

| | | | |
|---|---|---|---|
| 7,400,911 B2 | 7/2008 | Planning et al. | |
| 7,514,900 B2 | 4/2009 | Sander et al. | |
| 7,667,350 B2 | 2/2010 | Norimatsu et al. | |
| 7,692,411 B2 | 4/2010 | Trainor et al. | |
| 2005/0152108 A1* | 7/2005 | Goel et al. | 361/683 |
| 2006/0095647 A1* | 5/2006 | Battaglia et al. | 711/100 |
| 2006/0100002 A1* | 5/2006 | Luebke et al. | 455/574 |
| 2007/0080925 A1* | 4/2007 | Radivojevic et al. | 345/105 |
| 2008/0095261 A1* | 4/2008 | van Putten et al. | 375/295 |
| 2009/0159678 A1* | 6/2009 | Day et al. | 235/439 |
| 2009/0195349 A1* | 8/2009 | Frader-Thompson et al. | 340/3.1 |

OTHER PUBLICATIONS

RoomWizard™ Room Scheduling System by Steelcase, Item #08-0001406, Nov. 2008, [online], Retrieved from the Internet: <URL: www.steelcase.com/na/files/dyn/22a04cd74650e7439717fd055b65be18/08-0001406.pdf#page=1>.

* cited by examiner

*Primary Examiner* — Dennis M Butler

(74) *Attorney, Agent, or Firm* — Fish & Richardson P.C.

(57) ABSTRACT

A low power display device capable of receiving display information on a wireless network and powered by environmental power, without requiring a battery or a wired power connection, is described.

25 Claims, 10 Drawing Sheets

LOW POWER DISPLAY

BACKGROUND

This specification relates to information presentation.

In office buildings of some agencies and corporations, conference room schedules are printed on paper and posted daily. These paper schedules, while accurate at the time of posting, are sometimes inaccurate within a few hours. Furthermore, the amount of paper used and the human effort required to manually post daily paper schedules can be significant for an organization with a large number of conference rooms. Another example of potentially wasteful paper usage includes regular printing of a menu that changes daily. Generally, the periodic posting of information subject to change using paper can be quite inefficient.

Electronic display devices exist as alternatives to daily paper posting of conference room schedules and periodic posting of other information. However, these conventional devices can be expensive to purchase and install. For example, some conventional devices require investment in proprietary operating systems and applications, which may not be compatible with an organization's existing scheduling application. Additionally, these conventional devices typically require a wired network connection (e.g., an Ethernet connection) and a wired power connection (with or without a battery backup) that continuously supplies power to the devices. These requirements of conventional electronic display devices can render the devices impractical and cost-prohibitive for certain applications, such as those described above.

SUMMARY

This specification describes technologies relating to low power display devices and systems.

In general, one aspect of the subject matter described in this specification can be embodied in a low power display device that includes a power storage device; an environmental power source connected to the power storage device through a switch and configured to pass energy to the power storage device; a power control circuit connected to the power storage device and the switch and configured to selectively connect and disconnect the power storage device and the environmental power source, the power control circuit powered by the power storage device; a processing device configured to manage power consumption in the low power display device and powered by the power storage device; a transceiver connected to the processing device and configured to transmit a request for display information and to receive the display information on a wireless network, the transceiver powered by the power storage device; and a display device connected to the processing device and configured to display the display information, the display device powered by the power storage device.

Another aspect of the subject matter described in this specification can be embodied in a low power display system that includes a server; one or more base stations, each of the one or more base stations in communication with the server on a first network; and one or more low power display devices powered by environmental power, each of the one or more low power display devices in communication with a respective base station on a second network, the second network being a wireless personal area network.

Another aspect of the subject matter described in this specification can be embodied in a computer-implemented method for updating a schedule for a conference room. The method includes providing a low power display device in proximity to the conference room; powering the low power display device based on local environmental conditions; retrieving schedule information for the conference room from a remote source; and managing display of the schedule information for the conference room on the low power display device. Other embodiments of this aspect include corresponding apparatus and computer program products.

Particular embodiments of the subject matter described in this specification can be implemented to realize one or more of the following advantages. Paper conference room displays or other general displays based on printed paper, grid powered display devices, and battery powered display devices can be replaced with a wireless, low power display device that is automatically updated as needed to display up to date information (e.g., throughout the day). The display device is powered by indoor solar energy stored by a capacitor, which eliminates the need for a wired power connection (with or without a battery backup). The low power display device saves paper and in the case of conference room schedules replaces the manual process of physically delivering paper schedules to each conference room. Additionally, the low power display device eliminates the need for batteries which due to their chemical properties can pose environmental risks, and the need to periodically change batteries, as required in battery powered display devices, and also does not require a connection to a power grid. Use of the low power display can avoid costly infrastructure updates, the installation of additional power outlets, for example.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Low Power Display System

Figure 1:
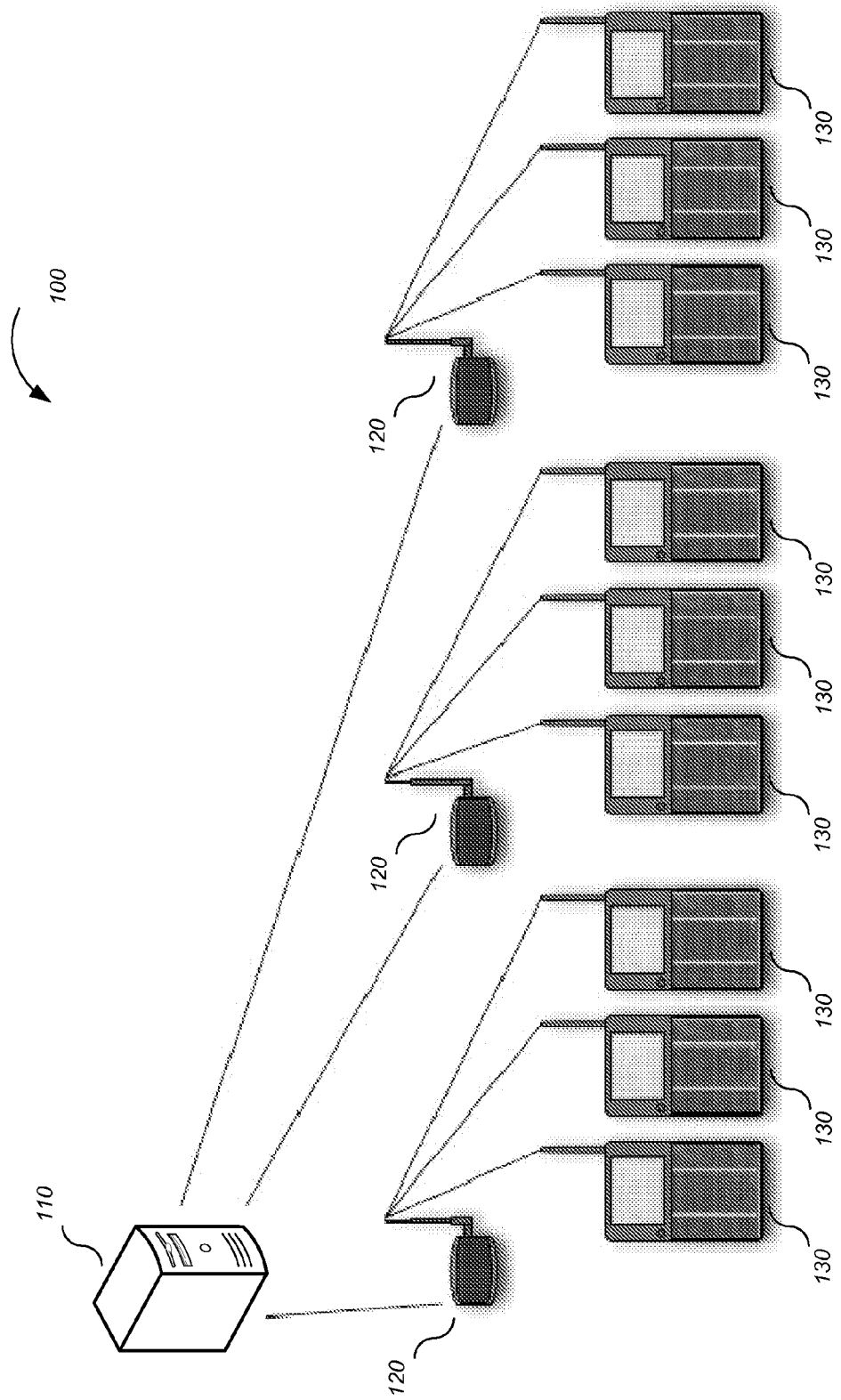
FIG. 1 is a block diagram of an example low power display system.

FIG. 1 is a block diagram of an example low power display system 100. The example low power display system 100 includes a server 110, base stations 120, and low power display devices 130. Although the example low power display system 100 is illustrated with one server 110, three base stations 120, and nine low power display devices 130, the low power display system 100 can include multiple servers 110, where each server 110 is connected to one or more base stations 120, and each base station 120 is connected to one or more low power display devices 130.

The server 110 serves as the central control for the low power display system 100. The server 110 can be implemented entirely in software, e.g., a server application. The low power display system 100 can be designed to utilize the server 110 for the majority of the system's processing needs. This, in turn, allows the base stations 120 and the low power display devices 130 to be less complex and implemented with less expensive components than if the system's processing was distributed more evenly across all the devices.

The server 110 coordinates the mapping of the low power display devices 130 to the base stations 120. In some implementations, the mapping of a low power display device 130 to a particular base station 120 is based on the radio signal strength of the low power display device 130. Such radio signal strength mapping techniques can be described in Part 15.4: Wireless Medium Access Control (MAC) and Physical Layer (PHY) Specifications for Low-Rate Wireless Personal Area Networks (WPANs), Institute of Electrical and Electronics Engineers (IEEE) Std 802.15.4-2006. Other mapping techniques can also be used. As part of managing the distribution of low power display devices 130 among the base stations 120, the server 110 can, in some implementations, also handle failover. That is, when a base station 120 fails, the server can re-allocate the mapping of the low power display devices 130 connected to the failed base station 120 to a functional base station 120.

In some implementations, the server 110 collects, aggregates, and exports status information and logs for the base stations 120 and the low power display devices 130. The status information collected can include, for example, the remaining power of a low power display device 130, the radio signal strength of a low power display device 130, the status messages passed from a low power display device 130 to a base station 120, and the frequency that a low power display device 130 communicates with a base station 120 or a base station 120 communicates with the server 110.

In some implementations, the server 110 is in communication with the base stations 120 over a network. In some implementations, the network is a local area network (LAN). For example, the base stations 120 can have a wired connection to the server 110 by an Ethernet connection, i.e., the IEEE 802.3 protocol. Alternatively, the base stations 120 can be wirelessly connected to the server 110 on a wireless LAN network, e.g., a Wi-Fi network standardized by IEEE 802.11.

In some implementations, the low power display system 100 can provide real-time, updated conference room scheduling information throughout the day. The updated conference room scheduling information can be distributed to the low power display devices 130 for display as a replacement for posted paper schedules. Other types of text or image information can alternatively be displayed using the low power display system 100. For example, the low power display devices 130 can display menus, rosters, advertisements, or any other information that can be accommodated by the display of the low power display devices 130. The low power display devices 130 can also display multiple types of information simultaneously or throughout the day. Further example uses of the low power display system 100 include the posting of general reservation information for resources, e.g., gym equipment and facilities such as weight machines, exercise machines, racquetball courts, and basketball courts.

In some implementations, in addition to displaying updated scheduling information for a particular conference room, a low power display device 130 can also display information about one or more nearby conference rooms. For example, the low power display device 130 can display a map of the floor indicating the particular conference room and the closest conference room that is currently available.

In some implementations, the low power display system 100 can distribute a particular type of data to a particular low power display device 130 depending on the location of the particular low power display device 130. For example, a first low power display device 130 located outside a cafeteria can receive menu information for display, while a second low power display device 130 located outside a conference room can receive the conference room's schedule for display.

In some implementations, a calendar application is integrated with an e-mail application, and the low power display device 130 associated with the office or cubicle of a particular user of the e-mail application can be posted outside the user's office or cubicle to display the user's calendar schedule.

Some organizations manage conference room schedules using a calendar application, where each conference room is a resource in the calendar application. Typically, individuals of the organization can use an interface of the calendar application to reserve a conference room for a particular meeting or event. Calendar data for the calendar application can be maintained on one or more servers remote to the low power display system 100.

If the low power display system 100 is used to provide conference room scheduling information, each low power display device 130 can be associated with a particular conference room that is a resource in the calendar application. The low power display device 130 can be located outside the associated conference room (e.g., attached by Velcro to a wall or door of the conference room). Typically, several base stations 120 can be placed on each floor of a building to provide coverage for all the conference rooms on the floor.

Each base station 120 is associated with one or more low power display devices 130 as determined by the mapping by the server 110. A base station 120 can retrieve display information for the low power display devices 130 to which the base station 120 is mapped. For example, the base station 120 can retrieve calendar data for the conference room associated with a particular low power display device 130. In some implementations, the calendar data is retrieved from the remote servers using an application programming interface (API) of the calendar application. The base station 120 can process the retrieved calendar data to generate instructions for rendering the calendar data as an image sized for the display of the low power display device 130. These instructions are then transmitted to the particular low power display device 130. In some implementations, data for one or more low power display devices 130 is cached at base stations 120 mapped to those low power display devices 120.

The base station 120 is in communication with the associated low power display devices 130 over a wireless network. In some implementations, the wireless network is a wireless PAN. For example, the base station 120 can be wirelessly connected to the associated low power display devices 130 on a wireless PAN based on the IEEE 802.15.4 protocol in the unlicensed 2.4 GHz spectrum. The IEEE 802.15.4 protocol works well for ubiquitous communication between devices within a wireless PAN, because the protocol delivers low-cost and low-speed communication. In addition, the protocol can be implemented in transceivers capable of communication at low power levels.

In some implementations, the base station 120 receives requests from one or more associated low power display devices 130 for display information. Exponential backoff can be used when the base station 120 is unavailable. For example, if a low power display device 130 transmits a request for display information to a base station 120 and the base station 120 is not responsive, the low power display device 130 can resend another request after a predetermined period of time has past. The periods of time between repeated requests can increase exponentially.

The base station 120 can be implemented as part software and part hardware. In some implementations, the base station 120 is a universal serial bus (USB) peripheral device coupled to a computer. In some implementations, the operating system of the computer runs a daemon that listens to the associated low power display devices 130 for requests to update display information (e.g., calendar data). The base station 120 includes a transceiver (e.g., a transceiver configured to support IEEE 802.15.4 protocol connectivity) to communicate with the associated low power display devices 130 on the wireless network.

In some implementations, the base station 120 is a small microcontroller-based system that does not need to be coupled to a computer for processing. In these implementations, some of the processing of the base station 120 can be shifted to the server 110, and the cost of the base station 120 can be significantly lower than the cost of the base station 120 in the USB peripheral device implementation. The microcontroller-based system can include, for example, a microcontroller, a small amount of storage, a LAN network interface, and a wireless PAN transceiver. The storage can be used for caching display data and log records.

Each low power display device 130 is associated with a particular base station 120 as determined by the mapping by the server 110. In order to communicate with the associated base station 120, the low power display device 130 includes a transceiver for the wireless network (e.g., a transceiver configured to support IEEE 802.15.4 protocol connectivity). The low power display device 130 uses the transceiver to request and receive display information from the associated base station 120. The low power display device 130 then renders the display information in accordance with instructions received by the associated base station 120. If the display information is calendar data for an associated conference room, an identifier (e.g., a MAC address) for the low power display device 130 can be used as a unique identifier for the associated conference room. The low power display device 130 is further described below in reference to FIGS. 2A-4.

Example Low Power Display Device

Figure 2A:
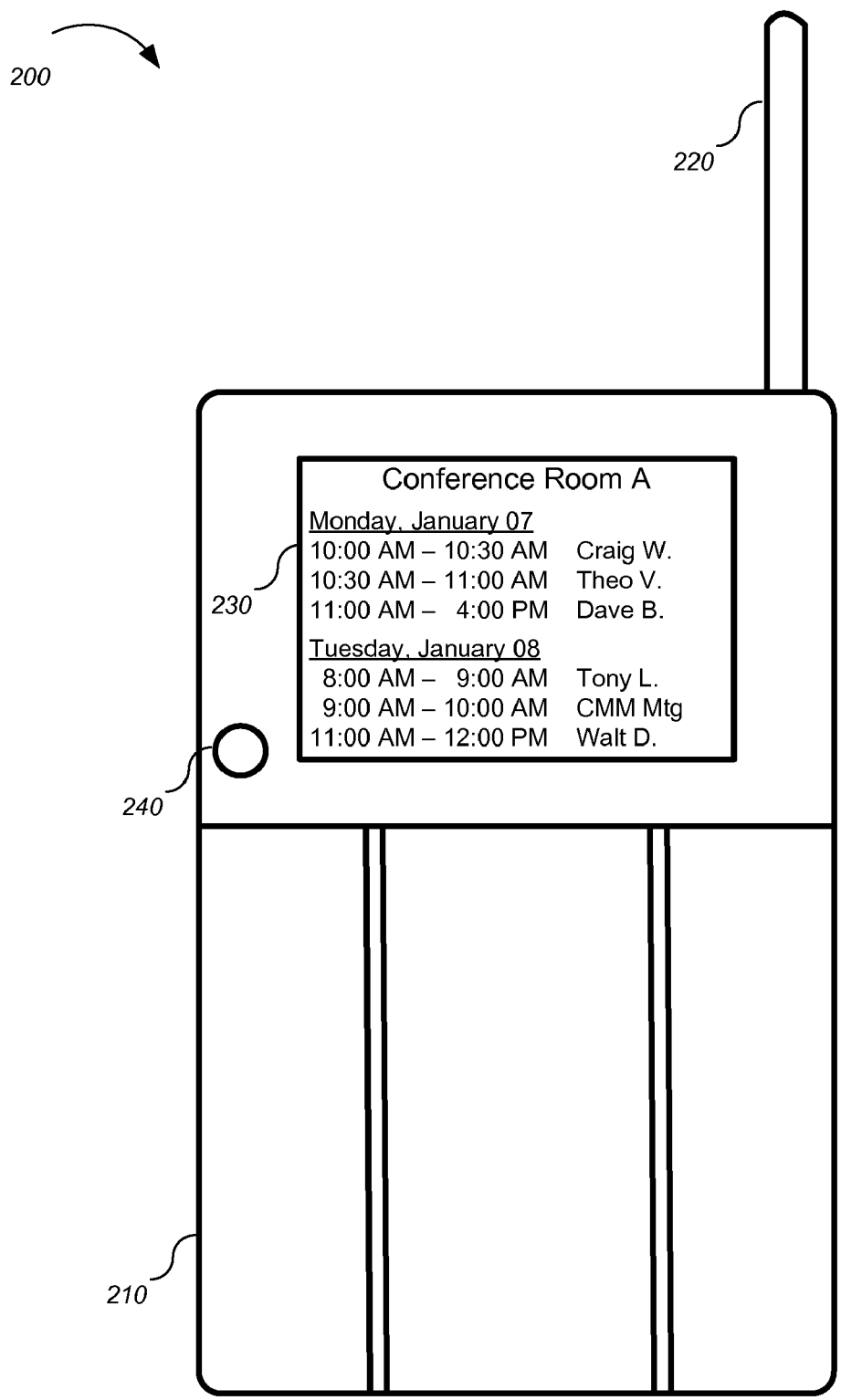
FIG. 2A is an illustration of an example low power display device of the low power display system of FIG. 1.
Figure 2B:
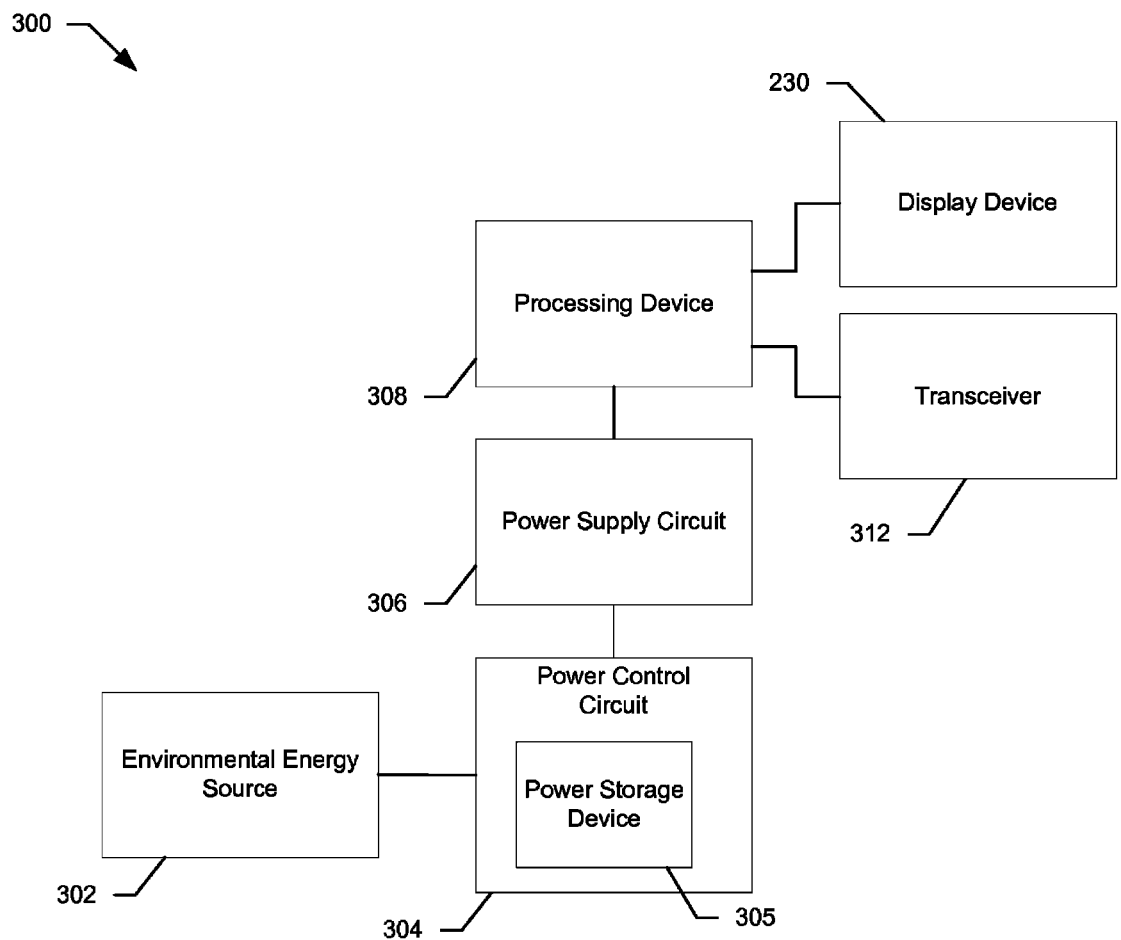
FIG. 2B is a block diagram of an example low power display device of the low power display system of FIG. 1.

FIG. 2A is an illustration of an example low power display device 200 of the low power display system 100 of FIG. 1, and FIG. 2B is a block diagram of an example low power display device of the low power display system 100 of FIG. 1. Although the example low power display device 200 is described in the context of a calendar data display system, other types of image or text data can alternatively be displayed. In some implementations, audio data can be provided in addition to or in lieu of display data. In some implementations, the low power display device 200 can be assembled by using off-the-shelf hardware components.

The low power display device 200 is an indoor solar powered, low power consumption display unit with wireless radio network connectivity. The low power display device 200 is designed to use small amounts of power, allowing it to be powered solely by solar energy collected by a solar panel 210 of the low power display device 200. The solar panel 210 of the low power display device 200 is capable of collecting any source of light energy, including indoor lighting. Although this indoor solar energy or ambient energy typically provides much less energy than normal outdoor solar energy, the solar energy collected from normal indoor lighting is sufficient to power the low power display device 130 without the need for a battery or a wired power connection.

Figure 2C:
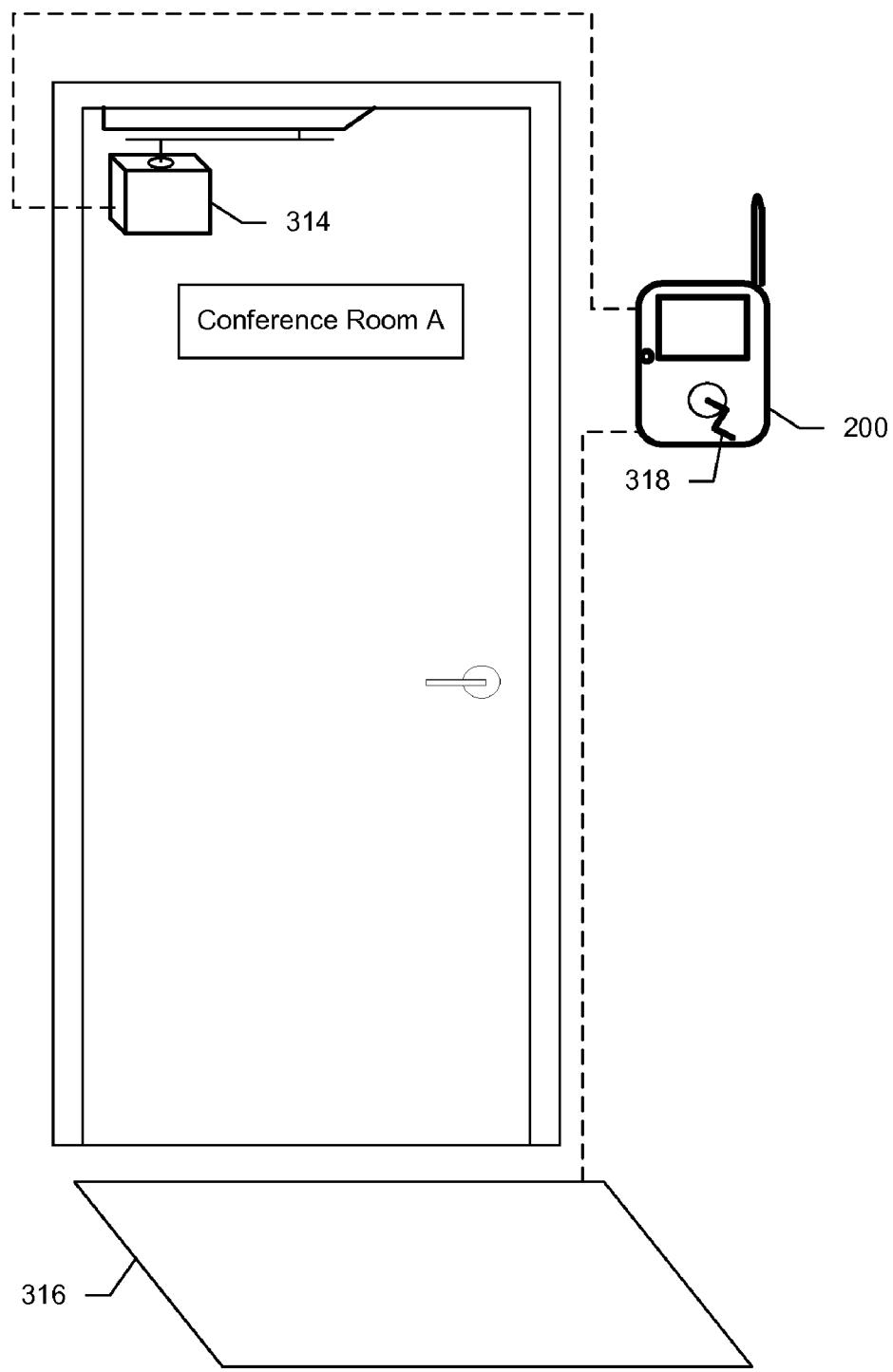
FIG. 2C is an illustration of example alternative energy sources of a low power display device.

FIG. 2C depicts example alternative energy sources of a low power display device 130. In some implementations, the low power display device 200 is powered by other passive power supplies or environmental power sources (e.g., a power source that takes, creates, or derives energy from its environment), which do not draw power from a connection to a power grid. For example, the low power display device 200 can alternatively be powered by parasitic energy, energy generated by opening and closing a door, energy collected from ambient radio frequency noise, or other energy sources. Energy can be obtained from a moving door, for example, through a DC motor turned through gearing by the motion of the door. An example for obtaining energy from a moving door is shown in FIG. 2C. Motor and gearbox 314 are turned by motion of the conference room door with respect to the doorframe. Alternatively, the gearbox 314 can be mounted to the doorframe instead of the door itself.

In some implementations, a hand crank such as the hand crank 318 shown in FIG. 2C or other user actuated device can be provided with the low power display device 200 so that a user can add power to the device as needed to view up to date information.

In some implementations, power can be supplied by a piezoelectric shock. For example, a piezoelectric mat 316 can be placed in front of or near a low power display device 200 so that a user stepping on the mat produces electricity due to a piezoelectric effect.

The low power display device 200 includes a power control circuit (such as the power control circuit 304 of FIG. 2B), which selectively connects and disconnects a power storage device 305 (e.g., a capacitor) from the solar panel 210, and a processing device (such as the processing device 308 of FIG. 2B), which manages power consumption in the low power display device 200 and communicates with the associated base station through the transceiver. Both the power control circuit 304 and the processing device 308 (e.g., a microcontroller) are powered by the power storage device 305 and are described in more detail below.

The power storage device 305 stores energy from the solar panel 210. In some implementations, the power storage device 305 (e.g., an ultracapacitor) is selected to provide sufficient charge storage capacity to eliminate the need for including a battery in the low power display device 200. The low power display device 200 also includes a transceiver (such as the transceiver 312 of FIG. 2B), which is powered by the power storage device that is local to the low power display device (e.g., an on board capacitor) and is used for communicating with the associated base station, as described above. The antenna 220 for the transceiver is illustrated in FIG. 2A.

A display device 230 of the low power display device 200 is connected to the processing device 308 and is powered by the power storage device (e.g., a capacitor). In the example of FIG. 2A, the display device 230 displays a rendered image of calendar data for the associated Conference Room A. The displayed calendar data includes the date, time, and organizer of events scheduled for Conference Room A, although other information can be additionally or alternatively displayed.

In some implementations, the display device 230 maintains a persistent rendered image of the display information without requiring additional power. For example, the display device 230 can be a cholesteric liquid crystal display (LCD). Traditional LCDs require power at all times to maintain an image. This amount of required power is generally more power than can be stored in the power storage device 305 of the low power display device 200. A cholesteric LCD allows the displayed image to stay fixed on the display indefinitely regardless of whether or not power is supplied to the low power display device 200. This type of persistent display is referred to as a bistable display. In some implementations, the display device 230 consumes about a half a joule of power when redrawing the full screen.

In some implementations, an additional solar panel can be hidden behind the display device 230. For example, some cholesteric LCDs allow approximately 50% reflectivity, which means about 50% of energy is transmitted through the cholesteric LCD to the background. If an additional solar panel is placed behind the display device 230, additional solar energy can be collected for storage locally in the power storage device (e.g., in a capacitor).

In some implementations, the solar panel 210 of the low power display device 200 is located behind the display device 230. In these implementations, the display device 230 occupies substantially the entire front surface of the low power display device 200. If the low power display device 200 includes a manual actuator 240 (as described below), the manual actuator 240 can be located on one side of the low power display device 200. Locating the solar panel 210 completely behind the display device 230 minimizes the footprint of the low power display device 200 while maximizing the space available for collecting power.

In some implementations, the low power display device 200 operates in an ultra-low power sleep mode. A cholesteric LCD can maintain the final image state even in sleep mode. In some implementations, microcontrollers of the low power display device 200 perform no processing while in sleep mode other than a hardware counter that wakes the low power display device once a sleep period has expired. For example, prior to entering the sleep mode, software of the microcontroller can indicate a duration of a sleep period that is used by the hardware counter to determine when to wake the device. In some implementations, a base station 120 can indicate the duration of a sleep period to a low power display device mapped to that base station 120.

The processing device can cause the low power display device 200 to enter the sleep mode. In some implementations, the low power display device 200 periodically wakes up to transmit a request to the associated base station for an update (e.g., for updated display information). In some implementations, the duration between periodic wake modes can be determined algorithmically. For example, the processing device can condition transmission of a request for display information based on the level of a charge in the power storage device 305. In some implementations, the duration between periodic wake modes is determined by a predictive algorithm.

In the example of FIG. 1, the low power display device 200 includes a manual actuator 240 (e.g., a hardware button). This manual actuator 240 can generate an actuation signal when actuated (e.g., depressed) by a user. The actuation signal can cause the processing device to awake the low power display device 200 from the sleep mode and cause the transceiver to wake up. In some implementations, wake up can include the display of information and/or the transmission of a request for display information. In some implementations, the charge stored in the capacitor is used approximately 2-3 seconds every hour to update the image of the display device 230 after updated display information is received.

In some implementations, the display device 230 can include an interface that allows a user to select one or more options by, for example, actuating the manual actuator 240. For example, if the display device 230 is used to display calendar data, an interface can allow a user to confirm attendance at an event, cancel an event, or extend the duration of an event. In some implementations, actuations of the actuator 240 are reported to the base station 120 to which the display device 230 is mapped. Processing performed in response to the actuation can be performed by the base station 120 and/or the server 110.

FIG. 2B shows a block diagram of an example low power display device 300. An output from the environmental energy source 302, a photovoltaic cell, for example, is connected to a power control circuit 304. The power storage device 305, (e.g., capacitor) of the power control circuit 304 collects energy from the environmental energy source 302 for powering the low power display device 200. Output from the power control circuit 304 is provided to the power supply circuit 306. Using power from the power control circuit 304, the power supply circuit 306 (a charge pump, for example) can provide one or more voltage outputs for use in the low power display device 200. The power supply circuit 306 can include, for example, one or more charge pump power supplies.

The power supply circuit 306 supplies power to a processing device 308, a display device 230, a transceiver 312, and in some implementations can provide power back to the power control circuit 304 for control functions of that circuit as described below. Power provided to the power control circuit 304 can be used, for example, by control logic and/or one or more processing devices of the power control circuit 304. The control logic and/or one or more processing devices of the power control circuit can, for example, control the flow of energy from the environmental energy source 302 to protect the low power display device 200. More specifically, the control logic and/or one or more processing devices of the power control circuit 304 can regulate the amount of charge collected in the power storage device 305 to protect the power storage device 305 from damage due to the accumulation of too high a charge (across a capacitor, for example).

In some implementations, the power control circuit 304 is configured in a default mode to allow current to flow from the environmental energy source 302 to the power supply circuit 306 when there is no power being supplied to the power control circuit 304 from the power supply circuit 306. Such a condition would be the case, for example, at an initial power up of the low power display device 200. After a transient period following power up of the lower power display device 200, the power supply circuit 306 will begin providing power to the power control circuit 304 which can then begin to monitor and control energy collection from the environmental energy source 302.

Power from the power supply circuit 306 is supplied to the processing device 308. The processing device 308 can interface with and receive data from the transceiver 312 for communication with one or more base stations 120 and can process the data for the display device 230 as described above.

Example Power Control Circuit

Figure 3A:
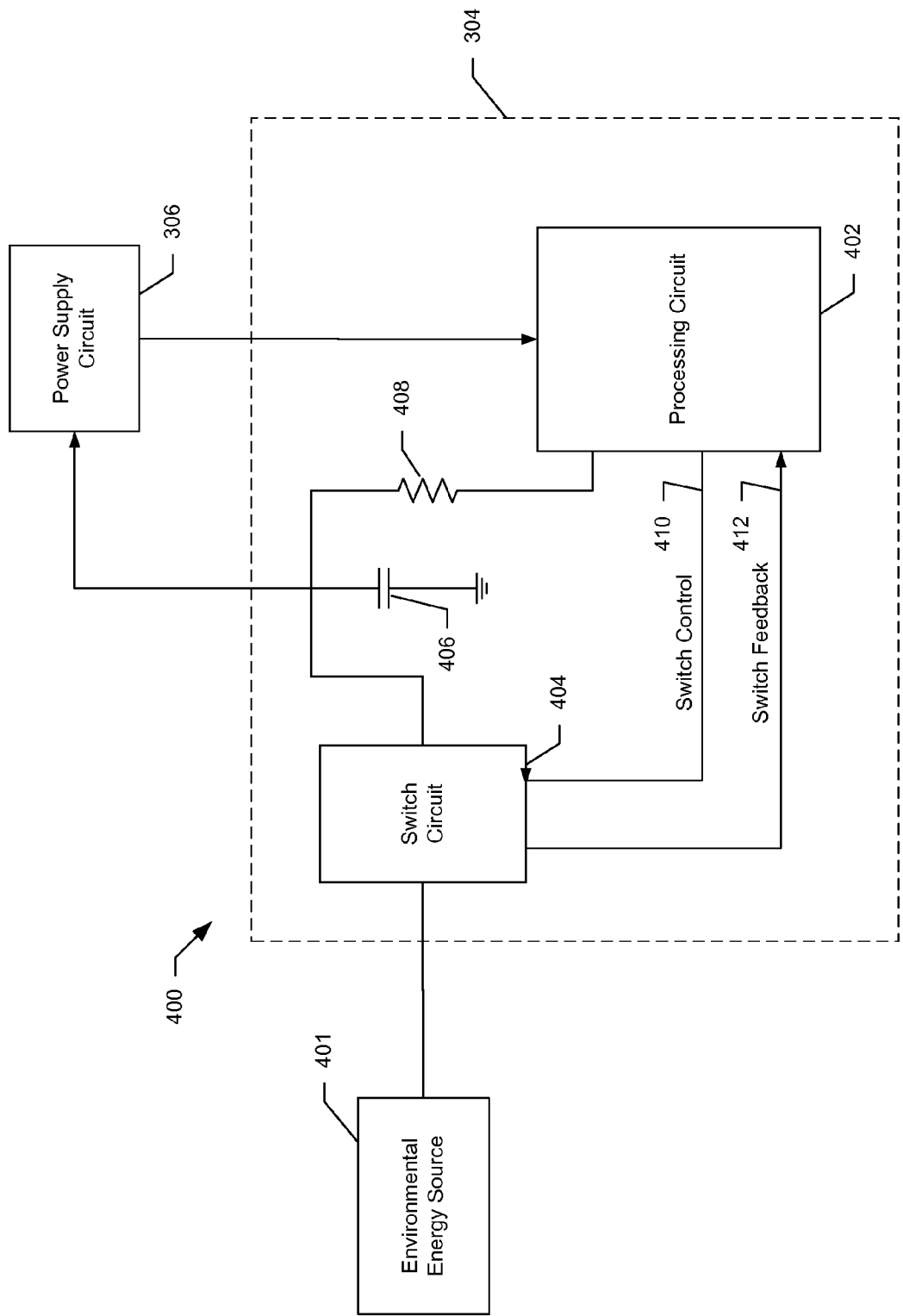
FIG. 3A is a block diagram of an example power control circuit of the low power display device of FIG. 2B.

FIG. 3A includes a block diagram 400 of an example power control circuit 304. A voltage output of a photovoltaic cell 401 is connected to a switch circuit 404. In a closed position, the switch circuit 404 connects the voltage output from the photovoltaic cell 401 to an ungrounded lead of a capacitor 406 and to an input of the power supply circuit 306. While the switch circuit is in a closed position the capacitor 406 accumulates an electrical charge. While the switch circuit 404 is in an open position, the photovoltaic cell 401 is disconnected from the capacitor 406 and the charge on the capacitor 406 is drained by the power supply circuit 306. Operation of the switch circuit is controlled by the processing circuit 402. The processing circuit 402 can receive power, a regulated voltage source, for example, from the power supply circuit 306.

The processing circuit 402 can monitor the voltage across the capacitor 406 at an input of the processing circuit 402 through, for example, a resistor 408. The processing circuit 304 can control the operation of the switch circuit 404 through the switch control line 410. A present state of the switch (i.e., whether the switch circuit is in an open or closed position) is supplied to the processing circuit 402 through the switch feedback line 412. The processing circuit 402 controls operation of the switch circuit 404 to maintain an input voltage to the power supply circuit 306 that is sufficient for power functioning of the power supply circuit 306 without damaging the capacitor 406. If the voltage across the capacitor 406 becomes too high (e.g., reaches a turn off voltage), the processing circuit can direct the switch circuit 404 to open in order to protect the capacitor 406 from damage. If the voltage across the capacitor becomes too low (e.g., reaches a turn on voltage), the processing circuit can direct the switch circuit 404 to close to charge the capacitor 406 using power from the photovoltaic cell 401.

Figure 3B:
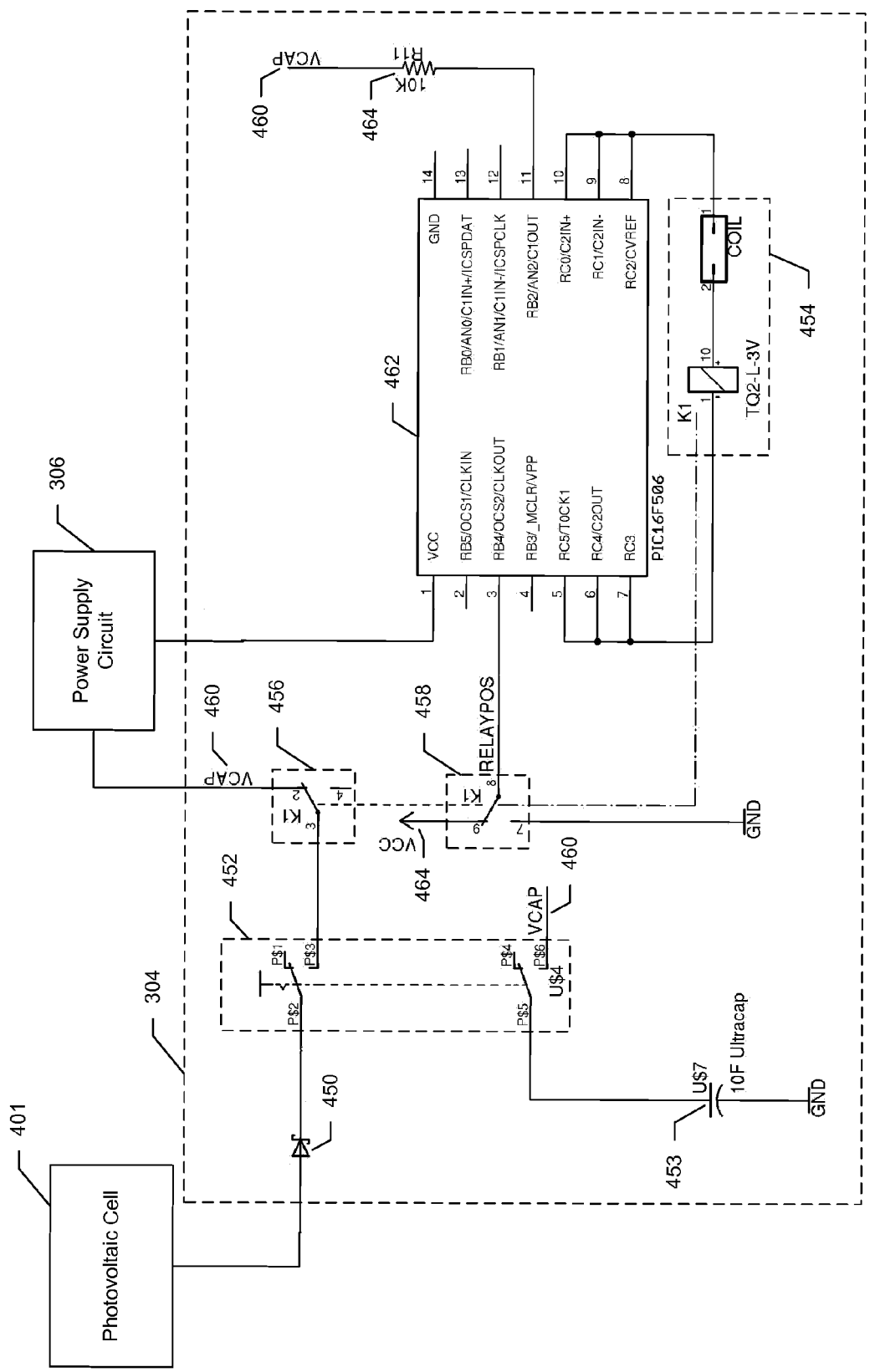
FIG. 3B is a schematic of an example charge control circuit of the low power display device of FIG. 2B.

FIG. 3B is a schematic of an example charge control circuit 304 of the low power display device 200. The power control circuit includes an on/off switch 452 that can be, for example, manually actuated by a user to switch the lower power display device on or off. In this example, the switch 452 is a double pole, double throw switch and is shown in an off (open) position. When the low power display device is switched on, electrical current flows from the photovoltaic cell 401 through a diode 450 (e.g., a schottky diode) to a (e.g., 10 farad) ultracapacitor 453 and to the power supply circuit 306. The diode 450 prevents current flow from the ultracapacitor 453 to the photovoltaic cell 401, in, for example, low-light conditions.

The switch circuit 404 of FIG. 3A is implemented in the schematic of FIG. 3B using a double pole double throw relay including coil element 454, pole 456 and pole 458. In some implementations, the relay is a bistable relay that maintains the last position to which it has been directed even after power has been removed from the coil. The use of a bistable relay reduces the power required to operate the voltage control circuit and thus reduces the overall power consumption of the low power display device 200. The relay is shown in a closed position that allows current from the photovoltaic cell 401 to power the power supply circuit 306 and to charge the capacitor 453. In the closed position, the pole 456 connects diode 450 through the power switch 452 to the node labeled VCAP 460 (which is shown connected to the input of the power supply circuit 306, to the capacitor 453, and to the resistor 464. When the relay is in an open position, the pole 456 disconnects the photovoltaic cell 401 from the VCAP node 460.

The pole 458 provides relay position feedback to the microcontroller 462 which implements the processing circuit 402 of FIG. 3A. When the relay is in a closed position, the pole 458 connects a pin of the microcontroller 462 to a node VCC 464 which can, for example, be connected to a regulated voltage output of the power supply circuit 306. When the relay is in an open position, the pole 458 connects this pin of the microcontroller 462 to ground. The microcontroller 462 (a PIC16F506, for example) can read a voltage at the pin connected to the pole 458 to determine a position of the relay.

The relay is actuated by the microcontroller 462. In the example shown, one side of the coil 454 is connected to three pins of the microcontroller 462 and the other side of the coil 454 is connected to three other pins of the microcontroller. Three pins are connected to either side of the coil to add the respective amount of current that the microcontroller can flow through each pin to reach the amount of current needed to flow through the coil 454 to actuate the relay. To actuate the relay, a logic 0 can be set at the three pins connected to one side of the coil 454 while a logic 1 is set on the three pins on the other side of the coil 454. Current flows from the pins set to logic 1 to those set to logic 0 through the coil 454 to set a state of the relay (closed for example). Flipping the logic state of the pins connected to the coil 454 will reverse the current flow to set the other state of the relay (open for example).

The microcontroller 462 monitors the voltage across the capacitor 453 through the resistor 464 and actuates the relay in order to protect the capacitor 453 from damage due to too high of a potential across its terminals. To conserve power the microcontroller 462 can be configured to maintain a state of low power consumption and leave that state periodically to sample the voltage across the capacitor 453, causing current to flow through the coil 454 only when needed to change the position of the relay from its present state as indicated by the feedback provided from pole 458. For example, the microcontroller can sample the voltage across the capacitor 453 four times per second, and only acting on that information (i.e., actuating the relay) if the relay needs to be switched from its current position.

In some implementations, a dual coil bistable relay can be used in place of the single coil relay described above.

In some implementations, the time interval between voltage samples (and any resulting changes made to the state of a switching circuit) is set, and a turn off voltage is selected so that a power storage device (e.g., a capacitor) can not be charged (by the environmental energy source (e.g., solar panel or photovoltaic cell) from the turn off voltage to a voltage that will damage it during the time between samples.

In some implementations, the time interval between voltage samples (and any resulting changes made to the state of a switching circuit) is set, and the turn on voltage is selected so that the power storage device can not be discharged from the turn on voltage to a minimum input voltage of the power supply circuit 306 during the time between samples. The minimum input voltage of the power supply circuit can be, for example, a lower limit below which the power supply circuit 306 will not function correctly.

In some implementations, the power control circuit 304 is designed to provide a window of hysteresis within which the switch circuit can remain in a given state for a period of time. Leaving the switch circuit in a given state (as opposed to rapidly transitioning the switch circuit between states to maintain the voltage across the capacitor) conserves power by allowing the processing circuit 402 to remain in a low power state and by avoiding the use of any power required to actuate the switch circuit.

For purposes of example, a capacitor used as a power storage device can have a rated voltage of 2.7 volts. In this example, the capacitor can be potentially damaged by voltages at some level higher than 2.7 volts (e.g., a maximum rated voltage limit of 3 volts). 2.7 volts can be used as the turn off voltage, and 2.5 volts can be used as the turn on voltage.

For low power display devices using a photovoltaic cell, charging times from 2.5 volts to 2.7 volts depend on an amount of ambient light. In full sunlight conditions charging from 2.5 to 2.7 volts can take less than one second. In dim light the charging time can be several minutes. Draining the capacitor from 2.7 volts to 2.5 volts generally takes more time, on the order of hours if the low power display device is in a sleep mode and no updates are occurring. Draining the capacitor from 2.7 volts to 2.5 volts can occur on the order of minutes if the display is being updated frequently. The voltage of the capacitor can be sampled, for example, every 250 milliseconds (4 times per second).

In some implementations one or more solid state devices, such as metal oxide semiconductor field effect transistors (MOSFETs) are used to switch the charging of the capacitor on and off and to provide current state feedback to a processing circuit.

Figure 3C:
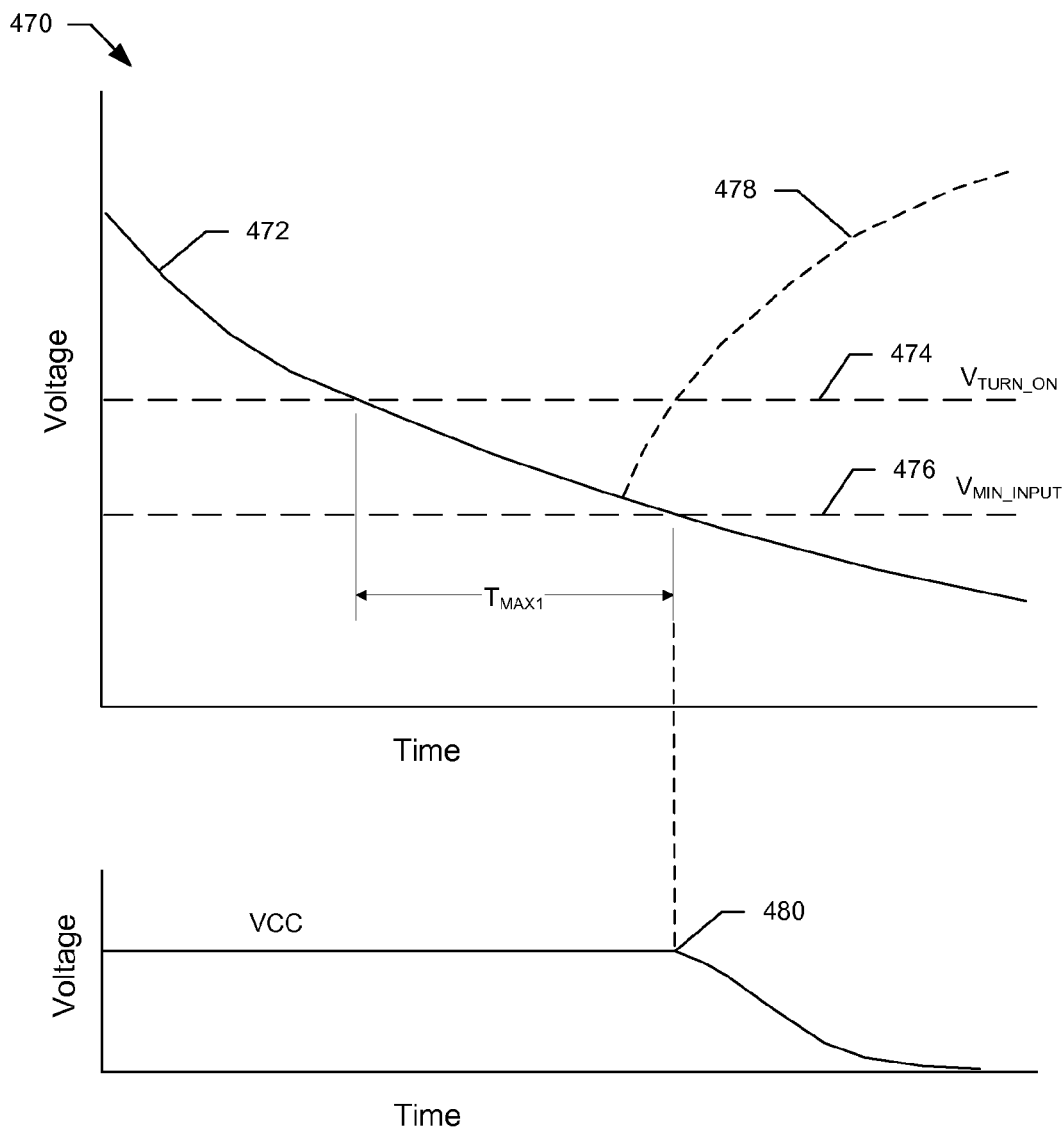
FIG. 3C shows an example graph of a decreasing voltage across a power storage device.

FIG. 3C shows an example graph 470 of a decreasing voltage across a power storage device. Line 472 represents a voltage across a power storage device (e.g., a capacitor) as the voltage is drained over time. Line 474 represents a turn on voltage of a power control circuit, and line 476 represents a minimum input voltage of a power supply drawing power from the power storage device. A processing circuit of the power control circuit can monitor the voltage across the power storage device and cause charging of the power storage device to begin if the monitored voltage is less than the turn on voltage. The dashed line 478 represents a voltage across the power storage device after the processing circuit has initiated charging of the power storage device.

If the voltage across the power storage device is allowed to decrease below the rated minimum input voltage of the power supply (e.g., a charge pump), the output of the power supply can drop as shown by line 480, for example. The sampling period for sampling the voltage across the power storage device and the turn on voltage can be selected so as to avoid a drop in the power supply output from occurring. For a given minimum rated voltage input to a power supply and turn on voltage, the maximum time between samples (shown as Tmax1 in FIG. 3C) is the time required for the voltage across the power storage device to be drained from the turn on voltage to the rated minimum input voltage of the power supply.

Figure 3D:
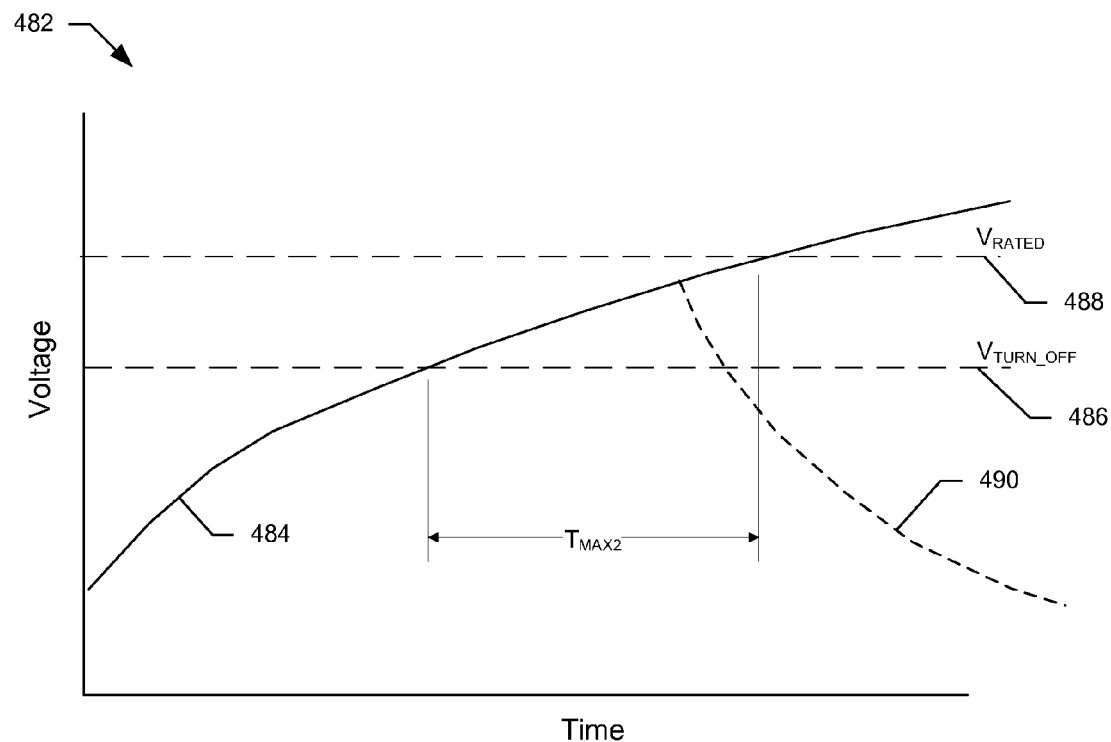
FIG. 3D shows an example graph 482 of an increasing voltage across a power storage device.

FIG. 3D shows an example graph 482 of an increasing voltage across a power storage device. The line 484 represents the voltage across a power storage device. The voltage is shown as increasing while the power storage device is being charged. Line 486 represents a turn off voltage of a power control circuit, and line 488 represents a maximum rated voltage of the power storage device (beyond which damage to the device could occur, for example). A processing circuit of the power control circuit can monitor the voltage across the power storage device and cause charging of the power storage device to cease if the monitored voltage is more than the turn off voltage. The dashed line 490 represents a voltage across the power storage device after the processing circuit has caused charging of the power storage device to cease.

If the voltage across the power storage device is allowed to increase above the maximum rated voltage of the power storage device, the power storage device could be damaged. The sampling period for sampling the voltage across the power storage device and the turn off voltage can be selected so as to avoid damaging the power storage device. For a given maximum rated voltage of a power storage device and turn off voltage, the maximum time between samples (shown as Tmax2 in FIG. 3D) is the time required for the voltage across the power storage device to increase from the turn off voltage to the maximum rated voltage of the power storage device.

Example Process for Operating the Power Control Circuit

Figure 4:
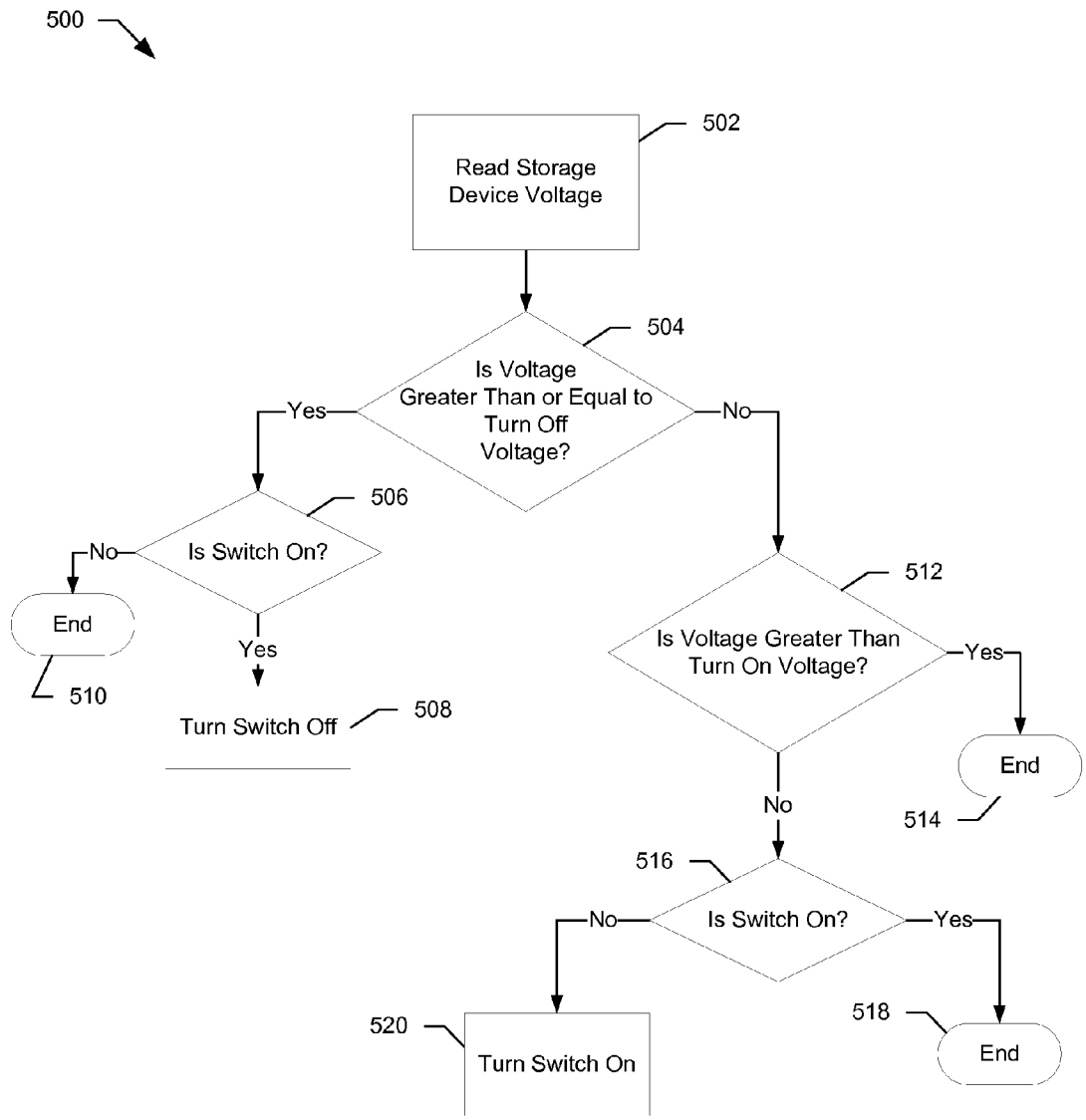
FIG. 4 is a flow diagram of an example process for operating the charge control circuit of FIG. 3B.

FIG. 4 is a flow diagram of an example process 500 for operating the power control circuit 304. A local power level is determined (e.g., the power storage device voltage is read) (502). For example, the processing circuit 402 of FIG. 3A can read the voltage across the capacitor 406 or, for further example, the microprocessor 462 of FIG. 3B can read the voltage across the capacitor 453.

The voltage level is compared to a turn off voltage (504). For example, the turn off voltage can be 2.7 volts If the voltage is greater than or equal to the turn off voltage, the position of the switch is checked (506). For example, the switch feedback line 412 can be read by the processing circuit 402 to determine the state of the switch circuit 404. For further example, the voltage from the relay pole 458 can be read by the microcontroller 462 to determine the position of the relay.

If the switch is on (i.e., set to allow a capacitor to charge) then the switch is turned off (508). If the switch is not on (i.e., already off) the process ends (510). The switch control line 410 can be used to change the state of the switch circuit if needed. For further example, the relay of FIG. 3B can be actuated using current flow between the sets of three microcontroller pins to turn it off. If the relay is already off, the relay is not actuated so as to conserve power (as compared to an open loop process without relay position feedback wherein the relay is directed to the off position if the capacitor voltage is greater than or equal to the turn off voltage regardless of the current state of the relay).

If the monitored voltage is less than the turn off voltage, the monitored voltage is compared to a turn on voltage (512). For example, the turn on voltage can be 2.5 volts.

If the monitored voltage is greater than a turn on voltage, the process ends (514). If the monitored voltage is not greater than the turn on voltage, the position of the switch is checked (516). For example, the processing circuit 402 can read the switch feedback line 412 or the microcontroller 462 can read the voltage at the pin connected to the relay pole 458.

If the switch is not on, it is turned on (520). For example, the processing circuit 402 can direct the switch to change states using the switch control line 404 or the microcontroller 462 can actuate the relay having coil 454.

If the switch is already on, the process ends (518).

The process 500 can be performed, for example, periodically by the processing circuit 402 (or the microcontroller 462). When the process is not being performed, the processing circuit 402 (or the microcontroller 462) can wait in a low power state to conserve energy.

Example Process for Updating a Conference Room Schedule

Figure 5:
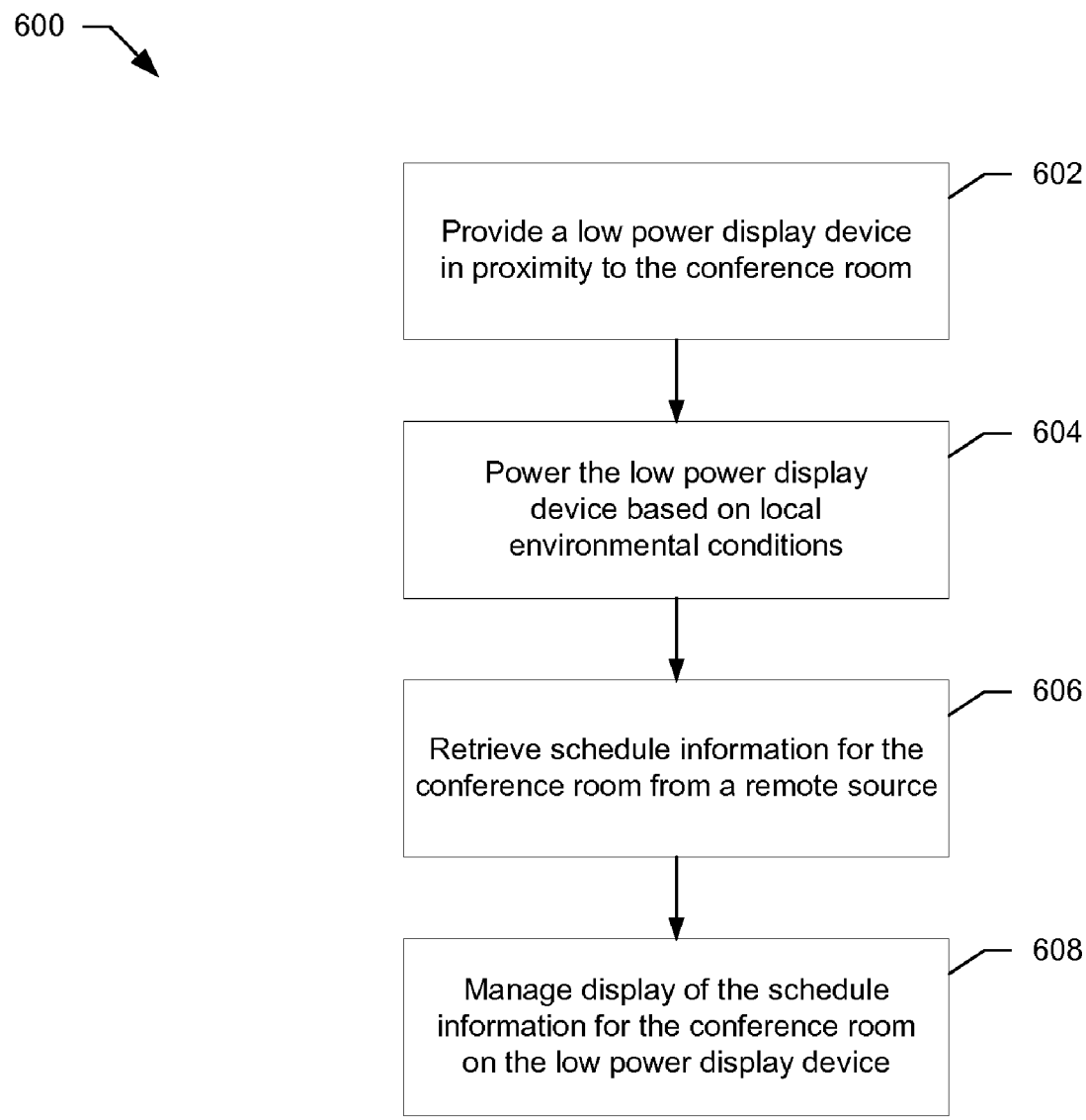
FIG. 5 is a flow diagram of an example process for updating a schedule for a conference room.

FIG. 5 is a flow diagram of an example process 600 for updating a schedule for a conference room. For convenience, the process 600 will be described with reference to the low power display system 100 of FIG. 1, which can perform the process.

A low power display device is provided in proximity to the conference room (602).

For example, the low power display device 130 can be located outside the conference room, e.g., by attaching the low power display device 130 with Velcro to the conference room door or wall.

The low power display device is powered based on local environmental conditions (604). In some implementations, the low power display device is powered by an environmental power source, e.g., indoor solar energy or radio frequency energy.

Schedule information for the conference room is retrieved from a remote source (606). For example, the low power display device can transmit a request for calendar data to a base station (e.g., a base station 120) or directly to a server running a calendar application.

Display of the schedule information for the conference room is managed on the low power display device (608). In some implementations, the remote source (e.g., a base station 120) generates instructions for rendering the schedule information and transmits the instructions to the low power display device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In some implementations, the low power display system does not include base stations, and the low power display devices are directly connected to one or more servers.

What is claimed is:

1. A low power display device comprising:
a power storage device;
an environmental power source connected to the power storage device through a switch and configured to pass energy to the power storage device;
a power control circuit connected to the power storage device and the switch and configured to selectively connect and disconnect the power storage device and the environmental power source, the power control circuit powered by the power storage device;
a processing device powered by the power storage device and configured to manage power consumption in the low power display device by:
selectively switching the low power display device between a wake mode of operation and a sleep mode of operation based on a time interval between wake modes;
causing a transceiver communicably coupled to the processing device to request display information during each wake mode of operation;
conditioning the low power display device to reduce power consumption during the sleep mode of operation relative to power consumption during the wake mode of operation;
receiving, from a remote device, a sleep period value specifying the time interval;
determining an amount of energy stored in the power storage device; and
adjusting the time interval based on the determined amount of energy stored in the power storage device;
the transceiver being configured to transmit a request for the display information and to receive the display information on a wireless network, the transceiver powered by the power storage device; and
a display device connected to the processing device and configured to display the display information, the display device powered by the power storage device.

2. The low power display device of claim 1, wherein the power control circuit comprises a power supply connected to the power storage device and configured to output a regulated voltage, the regulated voltage being used to power the power control circuit, the processing device, the transceiver, and the display device.

3. The low power display device of claim 1, wherein the display device has a bistable display that maintains a persistent rendered image of the display information without requiring additional power.

4. The low power display device of claim 3, wherein the display device is a cholesteric liquid crystal display comprising a first surface that displays the display information and a second surface opposite the first surface.

5. The low power display device of claim 4, further comprising a housing that supports the display device, wherein the environmental power source comprises a first solar panel positioned along a surface of the housing to receive light energy emitted by a light source external to the housing, wherein a second solar panel is positioned to face the second surface to receive light energy that passes from the first surface through the second surface, wherein the second solar panel is connected to the power storage device through a switch and configured to pass energy to the power storage device.

6. The low power display device of claim 1, wherein the transceiver is configured to support IEEE 802.15.4 protocol connectivity.

7. The low power display device of claim 1, wherein the processing device is a microcontroller.

8. The low power display device of claim 1, wherein the display information relates to calendar data of a calendar application running on a remote server.

9. The low power display device of claim 1, wherein the display information relates to a particular type of data, the particular type of data based on a location of the low power display device or a user associated with the low power display device.

10. The low power display device of claim 1, further comprising:
a manual actuator configured to generate an actuation signal when actuated by a user, the actuation signal causing the processing device to awake the low power display device from the sleep mode and to cause the transceiver to retrieve display information.

11. The low power display device of claim 1, wherein the environmental power source comprises:
a motor comprising a rotor, a stator, and an electrical conductor, the motor generating an electrical current on the electrical conductor in response to the rotor rotating, the electrical conductor being electrically coupled to the switch; and
a gear box comprising one or more gears, the gear box being configured to couple to a door or a door frame such that movement of the door relative to the door frame rotates the one or more gears, one of the one or more gears being coupled to the rotor to rotate the rotor in response to the one or more gears rotating.

12. The low power display device of claim 1, wherein the environmental power source comprises a piezoelectric mat that generates an electrical current onto an electrical conductor coupled to the switch in response to a user stepping onto the piezoelectric mat.

13. The low power display device of claim 1, wherein the environmental power sources collects energy from ambient radio frequency noise.

14. The low power display device of claim 1, wherein the display device comprises a liquid crystal display comprising a first surface that displays the display information and a second surface opposite the first surface, and wherein the environmental power source comprises one or more solar panels each positioned to face the second surface to receive light energy passing through the first and second surfaces.

15. A meeting room scheduling system comprising:
a server that receives and maintains calendar data for a plurality of meeting rooms;
one or more base stations, each of the one or more base stations in communication with the server on a first network; and
one or more low power display devices powered by environmental power, each of the one or more low power display devices in communication with a respective base station on a second network, the second network being a wireless personal area network, each of the one or more low power display devices being disposed proximal to one of the plurality of meeting rooms to display calendar data for the one meeting room, each of the one or more low power display devices comprising:
a power storage device;
an environmental power source connected to the power storage device through a switch and configured to pass energy to the power storage device;
a power control circuit connected to the power storage device and the switch and configured to selectively connect and disconnect the power storage device and the environmental power source, the power control circuit powered by the power storage device;

a processing device powered by the power storage device and configured to manage power consumption in the low power display device by:

selectively switching the low power display device between a wake mode of operation and a sleep mode of operation based on a time interval between wake modes;

causing a transceiver communicably coupled to the processing device to request calendar data for the low power display device from the respective base station during each wake mode of operation;

conditioning the low power display device to reduce power consumption during the sleep mode of operation relative to power consumption during the wake mode of operation;

receiving, from the respective base station, a sleep period value specifying the time interval;

determining an amount of energy stored in the power storage device; and adjusting the time interval based on the determined amount of energy stored in the power storage device;

a transceiver connected to the processing device and configured to transmit a request for the calendar data for the low power device to the respective base station and to receive the calendar data for the low power device from the respective base station, the transceiver powered by the power storage device; and a display device connected to the processing device and configured to display the calendar data for the low power device, the display device powered by the power storage device.

16. The meeting room scheduling system of claim 15, wherein the server is configured to coordinate a mapping of the one or more low power display devices to the one or more base stations.

17. The meeting room scheduling system of claim 16, wherein the mapping of a low power display device to a respective base station is based on radio signal strength of the low power display device.

18. The meeting room scheduling system of claim 15, wherein the server is configured to collect status information from one or more base stations or one or more low power display devices.

19. The meeting room scheduling system of claim 18, wherein the status information includes remaining power of a low power display device or radio signal strength of a low power display device.

20. The meeting room scheduling system of claim 15, wherein each base station is a universal serial bus peripheral device coupled to a computer.

21. The meeting room scheduling system of claim 15, wherein each base station is a microcontroller-based hardware unit.

22. The meeting room scheduling system of claim 15, wherein the calendar data for each low power device is retrieved using an application programming interface of a calendar application.

23. The meeting room scheduling system of claim 22, wherein the base station is configured to process the calendar data to generate instructions for rendering the calendar data as an image sized for a display of the respective low power display device.

24. The meeting room scheduling system of claim 15, wherein the wireless personal area network is based on an IEEE 802.15.4 protocol.

25. A computer-implemented method for updating a schedule for a conference room comprising:

providing a low power display device in proximity to the conference room;

powering the low power display device based on local environmental conditions and to manage power consumption in the low power display device; and managing display of schedule information for the conference room on the low power display device, wherein powering the low power display device to manage power consumption in the low power display device comprises:

selectively switching the low power display device between a wake mode of operation and a sleep mode of operation based on a time interval between wake modes;

requesting schedule information for the conference room from a remote source during each wake mode of operation;

conditioning the low power display device to reduce power consumption during the sleep mode of operation relative to power consumption during the wake mode of operation;

receiving, from a remote device, a sleep period value specifying the time interval;

determining an amount of energy stored in a power storage device that provides power to the low power display; and adjusting the time interval based on the determined amount of energy stored in the power storage device.

* * * * *